US009042934B2

(12) United States Patent
Faerber et al.

(10) Patent No.: US 9,042,934 B2
(45) Date of Patent: May 26, 2015

(54) METHOD FOR CONTROLLING INTERFERENCE IN A RADIO COMMUNICATIONS SYSTEM AND APPARATUS THEREOF

(75) Inventors: Michael Faerber, Wolfratshausen (DE); Andreas Lobinger, Grafing (DE); Christian Markwart, Munich (DE); Bernhard Raaf, Neuried (DE); Simone Redana, Munich (DE); Hanns Juergen Schwarzbauer, Gröbenzell (DE); Richard Waldhauser, München (DE); Bernhard Wegmann, Holzkirchen (DE)

(73) Assignee: Nokia Solutions and Networks Oy, Espoo (FI)

( * ) Notice: Subject to any disclaimer, the term of this patent is extended or adjusted under 35 U.S.C. 154(b) by 364 days.

(21) Appl. No.: 13/511,719

(22) PCT Filed: Dec. 7, 2009

(86) PCT No.: PCT/EP2009/066535
§ 371 (c)(1),
(2), (4) Date: Aug. 14, 2012

(87) PCT Pub. No.: WO2011/069534
PCT Pub. Date: Jun. 16, 2011

(65) Prior Publication Data
US 2012/0309384 A1    Dec. 6, 2012

(51) Int. Cl.
*H04B 7/00* (2006.01)
*H04W 72/08* (2009.01)
*H04W 72/04* (2009.01)
(Continued)

(52) U.S. Cl.
CPC ........ *H04W 72/082* (2013.01); *H04W 72/0406* (2013.01); *H04W 84/045* (2013.01); *H04W 88/12* (2013.01)

(58) Field of Classification Search
CPC ...................................................... H04W 84/14
USPC ............... 455/422.1, 423, 437, 522; 370/328, 370/332, 338
See application file for complete search history.

(56) References Cited

U.S. PATENT DOCUMENTS 8,295,874 B2 * 10/2012 Harris et al. ................... 455/522
8,504,055 B2 *  8/2013 Vikberg et al. ............... 455/453
(Continued)

OTHER PUBLICATIONS

R3-082442, 3GPP TSG RAN WG3 Meeting #61bis, Prague, Czechia, Sep. 30-Oct. 3, 2008, "Use of X2 to Mitigate Interference Between HeNBs and Macro eNBs", picoChip Designs Ltd., 2 pgs.
(Continued)

*Primary Examiner* — Amancio Gonzalez
(74) *Attorney, Agent, or Firm* — Harrington & Smith

(57) ABSTRACT

Method and Apparatus thereof, for controlling intercell interference in a radio communications system having a plurality of user equipment and a plurality of access nodes including the steps of: a user equipment of said plurality connected to a serving access node, upon determining that an access node of said plurality is causing interference, transmitting a request to said serving access node; said serving access node forwarding said request to an apparatus controlling said interfering access node over an X2 interface, and said apparatus, instructing said interfering access node to execute said request.

14 Claims, 2 Drawing Sheets

(51) Int. Cl.
*H04W 84/04* (2009.01)
*H04W 88/12* (2009.01)

(56) References Cited

U.S. PATENT DOCUMENTS

2009/0264077 A1* 10/2009 Damnjanovic .............. 455/63.1

2011/0243097 A1* 10/2011 Lindqvist et al. ............. 370/331

OTHER PUBLICATIONS

R4-093244, TSG-RAM Working Group 4 (Radio) meeting #52, Shenzhen, Aug. 24-28, 2009, "Downlink Interference Coordination Between eNodeB and Home eNodeB", NTT DOCOMO, 8 pgs.

* cited by examiner

- Access nodes 100 cover an area defined as a "macro-cell"
- Access nodes 200 cover an area defined as a "femto-cell"

Signal interfering with 10-2

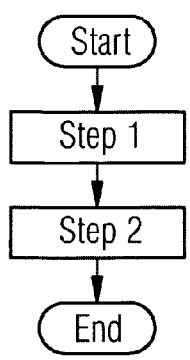
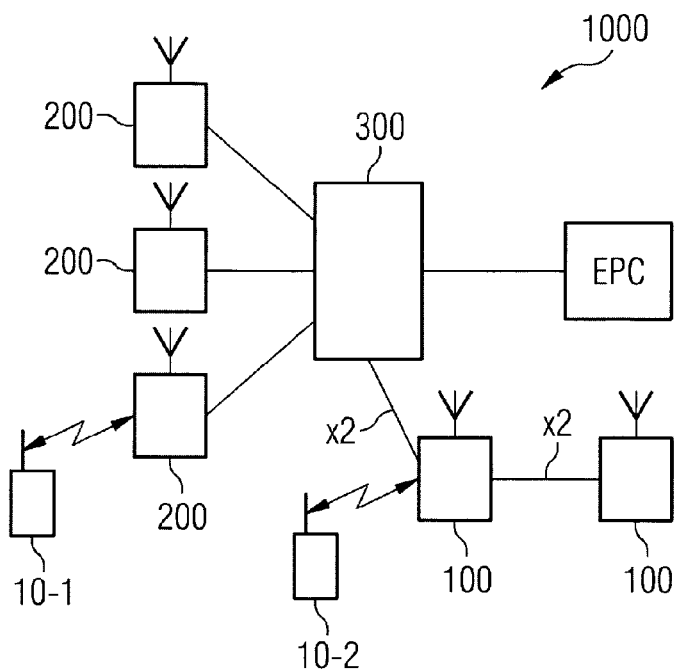
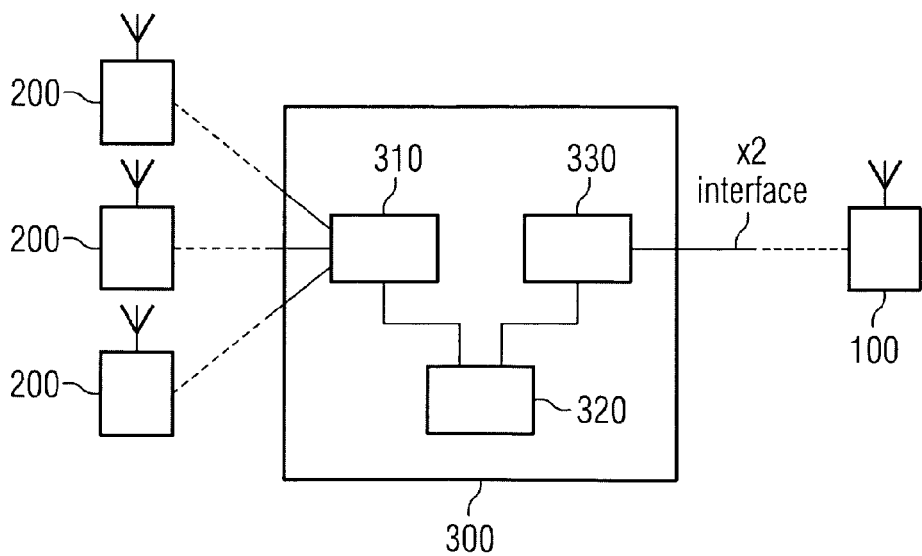

METHOD FOR CONTROLLING INTERFERENCE IN A RADIO COMMUNICATIONS SYSTEM AND APPARATUS THEREOF

FIELD OF THE INVENTION

The invention is used in radio communications systems to ensure that interference caused therein is controlled and the adverse effects are reduced.

SUMMARY OF THE INVENTION

In today's radio communications systems, the number of devices that use radio connections has increased dramatically over the past years. This increase in number has lead to an increase in the number of access nodes or base stations used throughout such radio communications systems in order to provide these devices with access to a PSTN/ISDN (Public Switched Telephone Network/Integrated Services Digital Network) and/or the internet. In the following description, the radio communications systems described, relates to systems using radio technologies known within the $3^{rd}$ and $4^{th}$ generation (3G, 4G) groups of radio technologies such as, for example, UMTS (Universal Mobile Telecommunications System), LTE (Long Term Evolution), or LTE-A (Long Term Evolution-Advanced), or HSPA (High Speed Packet Access). A particular feature of some of these radio communications systems that comprise devices that are situated within a small area, for example a building, is that access nodes or base stations are provided so as to cover the small area. These access nodes or base stations control a small cell which lies within a larger cell controlled by another access node or base station. In order to differentiate between these two cells, the small cell is defined as a "femto cell" while the larger one is defined as a "macro cell". Access nodes or base stations that control femto cells are defined as HeNBs (Home-evolved Node Bs), while those controlling macro cells are defined as Macro-eNBs.

In such an environment, HeNBs and Macro-eNBs use a segregated system architecture, whereby shared elements between the two architectures is limited to the OAM (Operations Administration Maintenance) and EPC (Evolved Packet Core) planes. Due to the fact that HeNBs are arbitrarily deployed within the radio communications systems and co-exist within an overlay of Macro eNBs, interference caused by radio signals emitted by the different access nodes or base stations (HeNBs, Macro-eNBs) can seriously affect communications within the radio system, in addition the EPC does not have the functionality to resolve any co-existence issues between HeNBs and Macro-eNBs. Usually, the HeNB to HeNB and the HeNB to Macro-eNB neighbourhood environment can be analysed by a HeNB UE (User Equipment) in the auto-configuration phase by monitoring the radio neighbourhood and any co-existence conflicts can be avoided. However, a problem arises in such a radio communications system, when HeNBs are used in a CSG (Closed Subscriber Group) environment. In such a situation, UEs connected to a Macro-eNB that are located in close proximity to a HeNB that is part of a CSG, will be affected by the interference generated by the HeNB. This problem can have a major impact on the quality of a communication in cases of co-channel deployment whereby both HeNBs and Macro-eNBs share a common spectrum.

A need therefore exists for a technique that can reduce the effects of such interference in radio communications systems comprising of both HeNBs and Macro-eNBs.

With the present invention, the above mentioned issues are resolved, allowing for a common radio spectrum to be shared between HeNBs and Macro-eNBs whilst at the same time reducing the effects of interference and thus increasing the efficiency of the radio communications system.

The technique is achieved by the teachings contained in the independent claims.

According to the independent method claim, a method is provided for controlling intercell interference in a radio communications system having a plurality of user equipment and a plurality of access nodes, comprising the steps of: a serving access node upon receiving a request from a user equipment directed to an access node of said plurality, forwarding the request to an apparatus controlling the access node, and the apparatus instructing said access node to execute the request.

According to the independent apparatus claim, an apparatus having means arranged for controlling intercell interference in a radio communications system comprises: transceiver means arranged to allow bi-directional communications with an access node, control means arranged to control the access node, and further transceiver means arranged to allow bi-directional communications with a further access node over an X2 interface, the further access node not being under the control of the apparatus.

Advantageous embodiments of the present invention are described by the dependent claims, wherein:

The request is directed to the access node upon the user terminal determining that the access node is causing interference. The request comprises a specific action to be executed by the interfering access node as well as additional information specifically relating to the serving access node, wherein the access node is part of a closed subscriber group. The specific action can be at least one of the following: a transmit power adjustment, a load balancing adjustment, an intercell interference coordination adjustment.

It is further pointed out that the invention may be realized by means of a computer program respectively software. According to a further refinement of the invention there is provided a computer-readable medium on which there is stored a computer program element for executing the steps of the method claim 1.

The program may be implemented as a computer readable instruction code in any suitable programming language, such as, for example, JAVA, C++, and may be stored on a computer-readable medium (removable disk, volatile or non-volatile memory, embedded memory/processor, control processor etc.). The instruction code is operable to program a computer or any other programmable device to carry out the intended functions. The program element may be available from a network, such as the World Wide Web, from which it may be downloaded.

Furthermore, the invention may also be realized by means of one or more specific electronic circuits respectively hardware. Furthermore, the invention may also be realized in a hybrid form, i.e. in a combination of software modules and hardware modules.

The computer-readable medium may be readable by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

SHORT DESCRIPTION OF THE DRAWINGS

The present invention will become more fully understood from the detailed description given herein below and the accompanying drawings which are given by way of illustration only, and thus are not limitative of the present invention, and wherein:

FIG. 2 depicts a flowchart showing the steps performed by the inventive method.

FIG. 3 depicts a block diagram of a radio communications system wherein the invention is implemented.

FIG. 4 shows a schematic block diagram of an apparatus in which the invention can be implemented.

DETAILED DESCRIPTION OF THE INVENTION

Figure 1A:
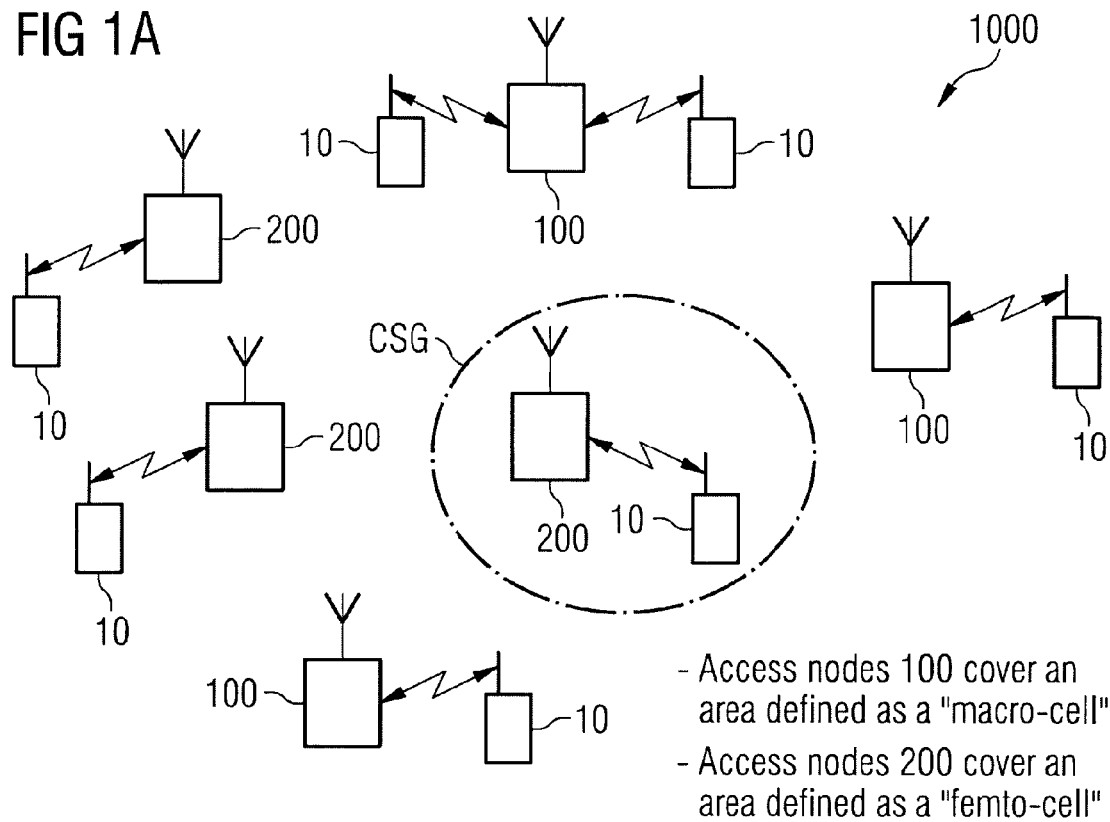
FIGS. 1a and 1b depict a radio communications system wherein interference affects user equipments.

FIG. 1a illustrates an environment wherein a radio communications system 1000 comprises of a plurality of access nodes 100 and 200. Access nodes 100 are Macro-eNBs while access nodes 200 are HeNBs. Radio communications system 1000 also comprises of a plurality of UEs 10 that are connected to the different access nodes 100, 200. An access node 200 can form a CSG in which only authorised UEs 10 are permitted to access.

Figure 1B:
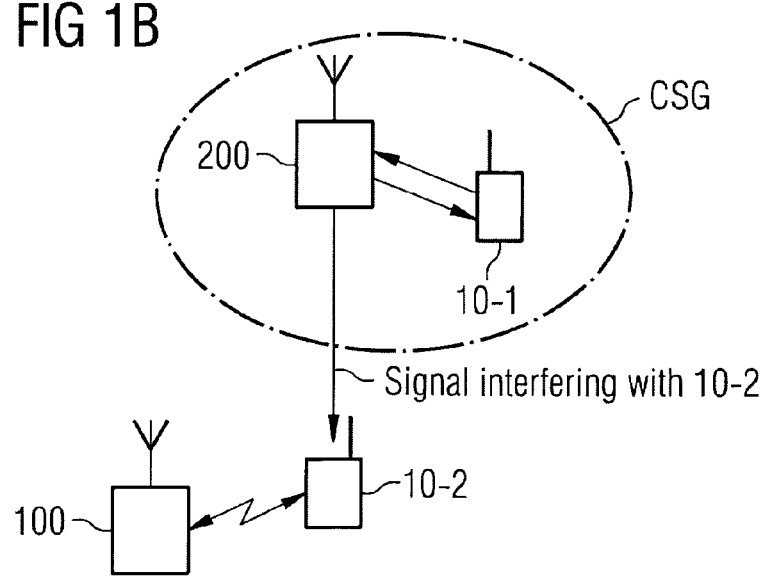

FIG. 1b illustrates a section of radio communications system 1000 wherein a transmitted signal from access node 200 forming a CSG with UE 10-1, interferes with UE 10-2 connected via a radio connection with its serving access node 100 and consequently causes degradation to signals received and/or transmitted by UE 10-2. UE 10-2 which is being interfered with detects the interference and the origin of the interference. UE 10-2 determines the origin of the interference as it can detect the PCI (Physical Cell Identity) of access node 200, as the PCI is part of the information that is broadcast by access node 200.

The steps executed by the invention are shown in FIG. 2. In step 1, the serving access node 100 upon receiving a request from UE 10-2 that is directed to access node 200, forwards the request to an apparatus 300 that controls access node 200 over an X2 interface, and in step 2 the apparatus 300 instructs access node 200 to execute the request. The request is directed to access node 200 when UE 10-2 determines that access node 200 is causing interference to it. The received request comprises a specific action to be executed by the interfering access node 200 as well as additional information specifically relating to the serving access node 100. The specific action to be executed can be at least one of the following: a transmit power adjustment, a load balancing adjustment, an intercell interference coordination adjustment to be executed by access node 200.

FIG. 3 depicts a block diagram of a radio communications system 1000 wherein the invention is implemented. System 1000 comprises of a plurality of access nodes 100 and a plurality of access nodes 200. It further comprises of at least one UE 10-2 connected to its serving access node 100 whose coverage defines a macro cell, at least one further UE 10-1 connected to its serving access node 200 whose coverage defines a femto cell and forms a CSG with UE 10-1 being permitted to access the CSG and apparatus 300. Access nodes 100, 200 are connected to the EPC via S1-MME, S1-U, and S1 interfaces. Access node 100 upon receiving a request from UE 10-2, which is being served by access node 100, directed to access node 200, forwards the request to apparatus 300 that controls access node 200 over an X2 interface. Apparatus 300 to which the request is forwarded to, as indicated herein above, is a device that controls numerous access nodes 200, which can be HeNBs, within radio communications system 1000. Apparatus 300 may be a HeNB-Gateway (HeNB-GW) having an X2 interface permitting connectivity with macro-eNBs 100 as well as a S1 interface acting as a concentrator and permitting connectivity with the EPC. The concentrator on the HeNB-GW is required for the C-plane and for the S1-MME interface and for the termination of the S1-U interface or for a direct logical U-plane connection between HeNB and the serving gateway of the EPC. A macro-eNB 100 views apparatus 300 as another macro-eNB which covers a multitude of cells. This is similar to a macro-eNB which may comprise 3 or 6 sector cells, however in the case of apparatus 300 it may support up to 20000 cells, wherein each HeNB 200 is considered as a cell.

Apparatus 300 also comprises an X2 interface permitting a connection with macro-eNBs (or simply eNBs) 100. As part of this connection, macro-eNBs 100 can address apparatus 300 and transmit reports if necessary to it. The termination of the X2 interface at apparatus 300, is done within a X2-Management router function, which permits apparatus 300 to perform message discrimination, message reformatting, HeNB identification and when necessary individual message routing to individual HeNBs 200.

FIG. 4 shows a schematic block diagram of apparatus 300 in which the invention can be implemented. The apparatus 300 has means arranged for controlling intercell interference in a radio communications system 1000. It comprises of:

transceiver means 310 arranged to allow bi-directional communications with an access node 200;

control means 320 arranged to control said access node 200, and further transceiver means 330 arranged to allow bi-directional communications with a further access node 100 over an X2 interface, said further access node 100 not being under the control of apparatus 300.

The control means 320 are also further arranged, upon receipt of a request over the X2 interface from the further access node 100, to instruct access node 200 to execute the received request. The request comprises a specific action to be executed by access node 200 as well as additional information specifically relating to the further access node 100. The specific action can be at least one of the following: a transmit power adjustment, a load balancing adjustment, an intercell interference coordination adjustment.

It is noted that the block structure could be implemented by a person skilled in the art as various separate physical units or as one physical unit comprising one or more physical or logical processing units which may be realized as a program code, e.g., software and/or firmware, running on a processing unit, e.g., a computer, microcontroller, ASIC, FPGA and/or any other logic device.

In this way interference caused to UE 10-2 by access node 200 can be reduced. Apparatus 300 upon reception of the transmitted request from the eNB 100 can resolve the address, such as the IP (Internet Protocol address) of the individual HeNB 200 and thus instruct the correct HeNB 200 to execute the request. This has the advantage that within radio communications system 1000, a connection is established between the femto cells and the macro cells, which allows for a fast exchange of eNB parameters and measurements and at the same time, avoids having to create a full meshed interconnection between eNBs 100 and HeNBs 200 within the radio communications system 1000.

As mentioned hereinabove, apparatus 300 may be a HeNB-GW, comprising of an X2 interface which is managed by an X2-Management router function which resides in control means 320. The functionality of which, is further described herein below.

In order to optimise the specific physical channel connections of the HeNBs, the message format on the S1/X2 Application level, as well as on the S1 interface, is kept the same. The HeNB-GW function is to mimic a 1:many to a 1:1 relation from the EPC point of view, as seen from the Application Protocol layer, because below this layer the S1 interface consists of 2 connections addressing different MMEs (Mobile Management Entities) for load sharing reasons.

The HeNB-GW for UE associated S1 Application Protocol (S1AP) signalling, only exchanges a S1AP protocol identity (ID) from that exchanged between the HeNB-GW and the EPC to that of the S1AP protocol ID, that is used between a HeNB and the HeNB-GW. Any non UE associated signalling is terminated at the HeNB GW. This results in that the S1AP is identical for both sides of the HeNB-GW.

The function of the X2 Management Router is to hide Radio Access Network (RAN) communications from the EPC. For the purpose of X2 communication the X2 Management Router resolves the routing of many to many Application Protocol Layer connections, because different neighbour eNBs may have to contact an HeNB via the X2 Management Router. From the HeNBs point of view, the X2 interface still appears as a point to point connection, i.e. the functionality provided by the X2 Management Router is transparent to the HeNBs.

Automatic X2 establishment is provided by S1 communication between eNBs 100. This establishment can be intercepted at the HeNB-GW 300. The X2 Management Router announces itself at the HeNB-GW 300 and informs it about its IP address. Then the HeNB-GW, when intercepting/handling the S1 signaling messages (i.e. eNB CONFIGURATION TRANSFER and MME CONFIGURATION TRANSFER) replaces the TNL (Transport Network Layer) address of the HeNB 100 with the TNL address of the X2 Management Router in the eNB CONFIGURATION TRANSFER reply message (the TNL address information is only carried in the eNB/MME CONFIGURATION TRANSFER replay messages). This ensures that the SCTP (Stream Control Transmission Protocol) association carrying the X2 Application Protocol, which is always bidirectional, is established from the requesting source eNB 100 to the X2 Management Router function and not to the HeNB 200. Furthermore the HeNB-GW 300 extracts the Global eNB ID and Selected TAI (Timing Advance Index) from both source (i.e. requesting eNB 100) and target HeNB 200 of the, to be established, X2 connection and the TNL Address of the target HeNB 200. All this information can be extracted by the HeNB-GW 300 from the S1 messages and is provided to the X2 Management Router function. The X2 Management Router function can then store and use this information when the source eNB 100 wants to establish the X2 connection.

For that purpose, the requesting source eNB 100 first has to initiate a SCTP association between itself and the X2 Management Router function. Then the requesting eNB 100 sends the X2AP X2 SETUP REQUEST message to establish the X2AP. The X2 Management Router function uses the saved information in order to identify the proper HeNB 200, to establish the SCTP association to this HeNB 200 and to maintain the mapping between these SCTP associations for the duration that the X2 interface is active. The received X2AP X2 SETUP REQUEST message comprises the Global eNB ID of the eNB 100 that is requesting X2 establishment. This ID could be used by the X2 Management Router function to find the corresponding entry in the previously generated table and to retrieve the TNL address of the actually targeted HeNB 200. Then the X2 Management Router function can establish a SCTP association between itself and the target HeNB 200 and then forward the messages received so that the request can be executed by the target HeNB 200. In this way it is possible to identify the proper TNL address of the target HeNB 200 and create a unique mapping between the established SCTP associations, thus ensuring that in the event of multiple X2 SETUP REQUEST messages being received at the X2 Management Router, the correct target HeNB 200 for each X2 SETUP REQUEST message is chosen.

Although the invention has been described in terms of preferred embodiments described herein, those skilled in the art will appreciate other embodiments and modifications which can be made without departing from the scope of the teachings of the invention. All such modifications are intended to be included within the scope of the claims appended hereto.

The invention claimed is:

1. A method, comprising:
controlling intercell interference in a radio communications system having a plurality of user equipment and a plurality of access nodes, comprising:
a serving access node upon receiving a request from a user equipment directed to an access node of said plurality, forwards said request to an apparatus controlling said access node over an X2 interface, wherein said request is directed to said access node based upon said user equipment determining that said access node is causing interference; and
said apparatus instructing said access node to execute said request, and
wherein said request comprises a load balancing adjustment action to be executed by an interfering access node as well as additional information specifically relating to said serving access node.

2. The method according to claim 1 wherein, said additional information comprises a global identification and a timing advance index of the serving access node.

3. The method according to claim 1 wherein, said request further comprises at least one of a transmit power adjustment, and an intercell interference coordination adjustment to be executed by said interfering access node.

4. The method according to claim 1 wherein, said access node is part of a closed subscriber group.

5. An apparatus comprising:
at least one processor; and
at least one memory including computer program code, where the at least one memory and the computer program code are configured, with the at least one processor, to cause the apparatus to at least:
control intercell interference in a radio communications system comprising:
allowing bi-directional communications with an access node;
controlling said access node;
allowing bidirectional communications with a further access node over an X2 interface, said further access node not being under the control of said apparatus; and
upon receipt of a request over said X2 interface from the further access node, instructing the access node to execute said received request, said request comprises a load balancing adjustment action to be executed by said access node as well as additional information specifically relating to said further access node, wherein said request is directed to said access node based upon said further access node determining that said access node is causing interference.

6. The apparatus according to claim 5, wherein said access node is part of a closed subscriber group.

7. The apparatus according to claim 5, wherein said additional information comprises a global identification and a timing advance index of the further access node.

8. The apparatus according to claim 5, wherein said request further comprises at least one of a transmit power adjustment, and an intercell interference coordination adjustment to execute.

9. The apparatus according to claim 5, wherein said apparatus is a HeNB-Gateway.

10. A non-transitory computer readable medium embodying computer program code, the computer program code executed by at least one processor to perform operations comprising:

controlling intercell interference in a radio communications system comprising:

allowing bi-directional communications with an access node;

controlling said access node;

allowing bidirectional communications with a further access node over an X2 interface, said further access node not being under the control of said apparatus; and upon receipt of a request over said X2 interface from the further access node, instructing the access node to execute said received request, said request comprises a load balancing adjustment action to be executed by said access node as well as additional information specifically relating to said further access node, wherein said request is directed to said access node based upon said further access node determining that said access node is causing interference.

11. The non-transitory computer readable medium of claim 10, wherein, said additional information comprises a global identification and a timing advance index of the further access node.

12. The non-transitory computer readable medium of claim 10, wherein said request comprises further at least one of a transmit power adjustment, an intercell interference coordination adjustment to be executed.

13. The non-transitory computer readable medium of claim 10 embodied in an HeNB-Gateway.

14. The non-transitory computer readable medium of claim 10 wherein, said access node is part of a closed subscriber group.

* * * * *